Nov. 29, 1955 — T. W. RAMSAY — 2,724,877
WEATHER STRIP
Filed Jan. 12, 1953 — 3 Sheets-Sheet 1
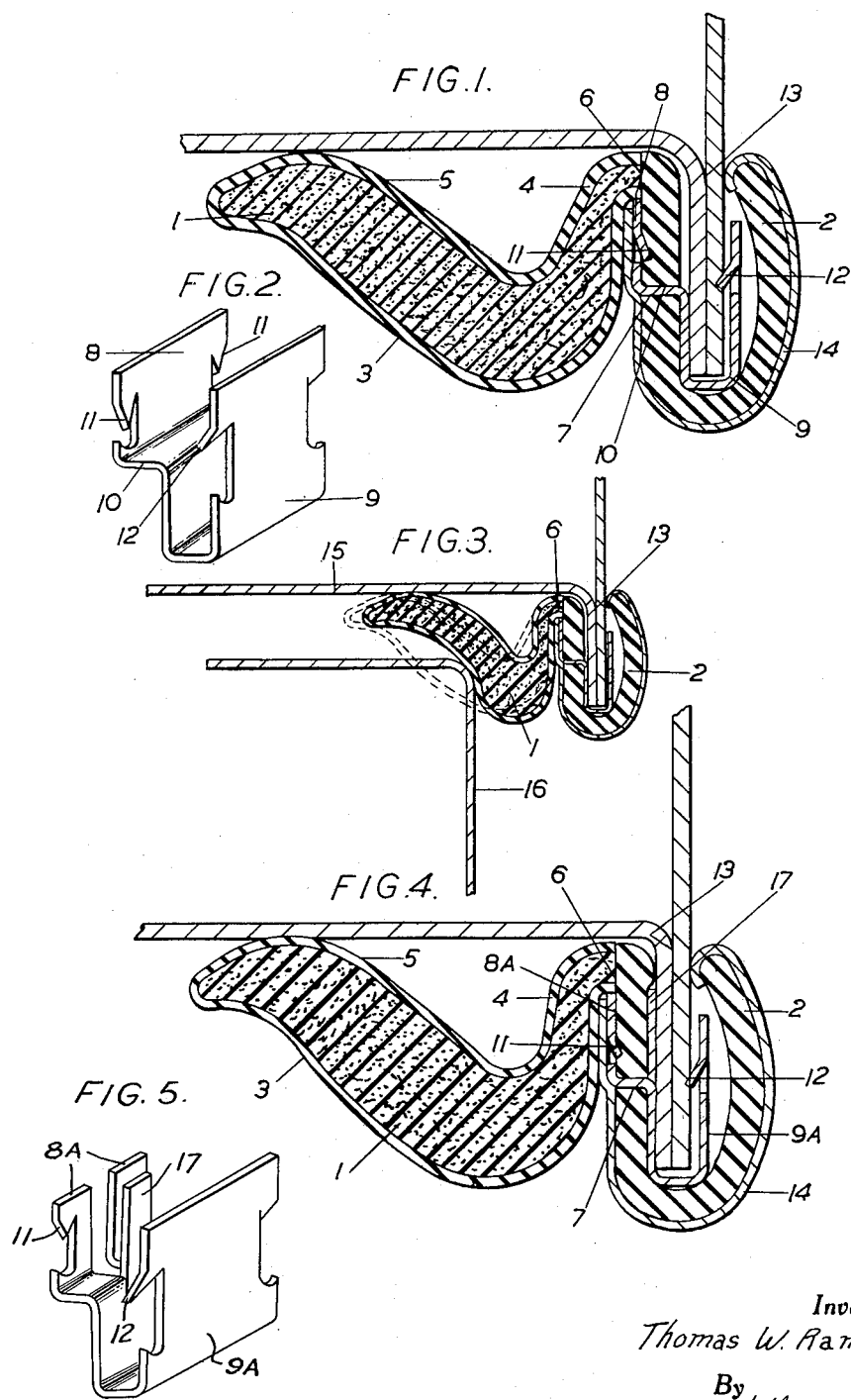
Inventor
Thomas W. Ramsay

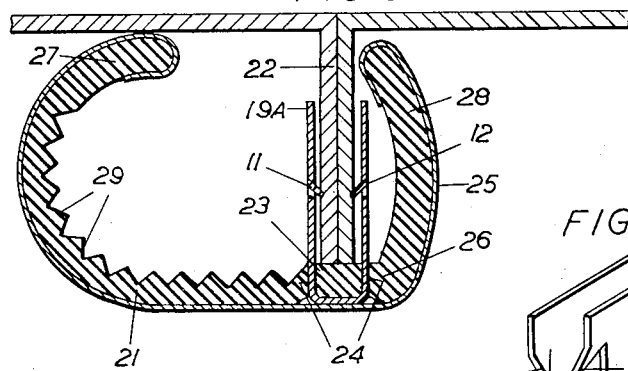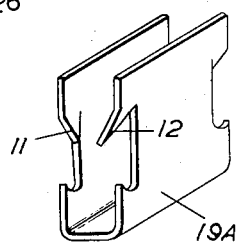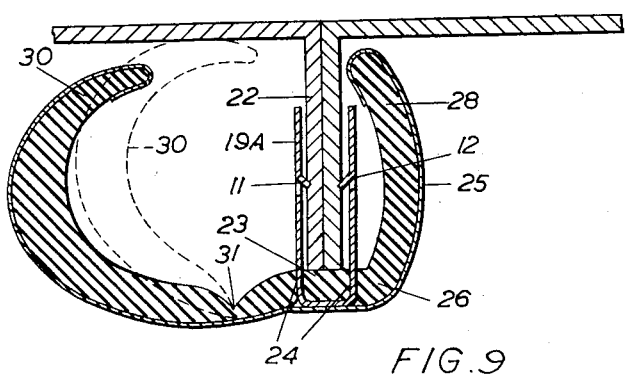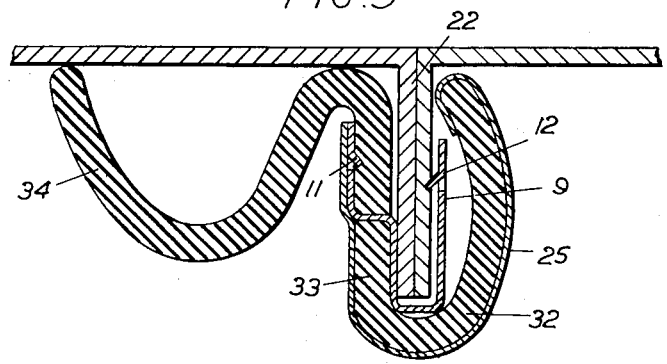

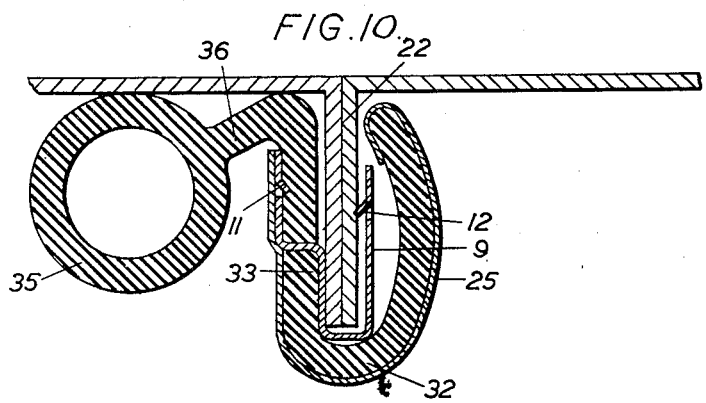
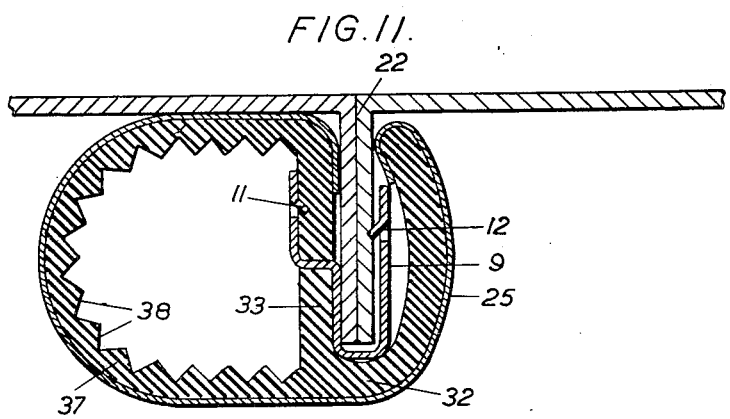
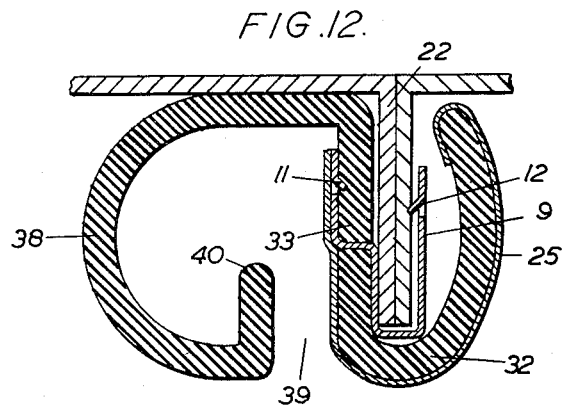

United States Patent Office 2,724,877
Patented Nov. 29, 1955

2,724,877
WEATHER STRIP

Thomas W. Ramsay, Headington, Oxford, England, assignor to Morris Motors Limited, Cowley, England Application January 12, 1953, Serial No. 330,772

5 Claims. (Cl. 20—69)

This invention relates to means for sealing doors and windows against draughts, dust and the weather, and is particularly applicable to automobiles and other motor vehicles.

Owing to the rather exacting requirements to be fulfilled, it has proved very difficult to evolve completely satisfactory door-sealing devices for mass-produced motor vehicles. The fitting procedure should be as straightforward as possible, in order that it may not occupy an undue amount of time on the production lines. The degree of sealing required is that capable of preventing ingress of fine dust into vehicles under the severe conditions encountered in territories subject to dust storms. In addition the sealing device must be so designed that it presents a neat appearance when fitted to the vehicle and does not exhibit local puckering or other distortion of the sealing element when this is constrained to follow a curved path, as at the corners of the door openings.

It is an object of the present invention to meet the foregoing requirements to a fuller extent than has been achieved heretofore.

Another object of the invention is to bring about a substantial reduction in the cost of producing sealing means of the kind in which a flexible strip of rubber or sponge rubber incorporates a sealing element proper and an integrally-formed attachment portion which is retained, on a supporting flange providing an abutment face around the door or window opening, by a series of channel-like spring clips designed to grip, and to offer strong frictional resistance to dislodgment from, the flange. The latter is ordinarily a structural feature present around the door openings of motor vehicles with pressed metal bodies, inasmuch as it is created by welding together the flanged edges of the inner and outer body side panels.

A further object of the invention is to anchor the aforesaid spring clips directly to the attachment portion of the sealing means prior to fitting the latter to the supporting flange.

The invention will now be described with reference to the accompanying drawings, in which:

Figure 1 shows, in cross-section, an example of a sealing device in accordance with the invention mounted on a supporting flange;

Figure 2 is a perspective view of a spring clip which forms part of the assembly shown in Figure 1;

Figure 3 is a fragmentary plan view, in section, illustrating the application of the sealing device of Figure 1 to a door pillar of a motor vehicle;

Figure 4 shows the same construction of sealing device as Figure 1 but with a different design of spring clip;

Figure 5 is a perspective view of the spring clip which forms part of the assembly shown in Figure 4;

Figure 6 shows, in cross-section, another example of a sealing device in accordance with the invention mounted on a supporting flange;

Figure 7 is a perspective view of the spring clip which forms part of the assembly shown in Figure 10; and Figures 8 to 12 are cross-sectional views illustrating five further examples of sealing devices in accordance with the invention, each mounted on a supporting flange.

In the case of the arrangement illustrated in Figure 1 the sealing device comprises a flap-like sealing strip 1 of sponge rubber and a substantially U-shaped attachment strip 2 of rubber. The attachment strip 2 may conveniently be formed by extrusion. It is afterwards placed in the same mould as the sealing strip 1 so that the two become bonded in the curing process. The sealing strip 1 of sponge rubber, encased in a thin skin 3 of rubber about one-sixtyfourth of an inch thick, preferably has a cross-section of shallow V-shape, but with rounded apex and limbs 4 and 5 of unequal lengths. The edge of the shorter limb 4 is bonded to the outer surface of one limb of the attachment strip 2 adjacent its extremity to establish the required hinge-like connection 6 between the two strips. At about half its depth, the same limb of the attachment strip 2 is formed with a succession of transverse slots 7 spaced longitudinally thereof two or three inches apart, each serving to receive an offset limb 8 of one of a series of retaining clips 9 (see Fig. 2), made of spring steel. The limb 8 of the clip 9 is bent twice to create a transverse intermediate portion 10 so that, when passed through the slot 7 from the inside of the attachment strip 2, its intermediate portion 10 lies in the slot and transfixes the attachment strip 2 whilst its outer, offset portion extends, as shown in Figure 1, between the adjoining parts of the attachment strip 2 and the sealing strip 1. The aforesaid outer portion of the clip 9 is formed with inwardly directly barbs 11 to anchor it to the adjoining limb of the attachment strip 2, whilst the other limb of the clip has similar barbs 12 arranged to engage a supporting flange 13. After the clips 9 have been fitted to the attachment strip 2 the latter has an outer fabric covering 14 adhesively applied to it, and is secured to the supporting flange 13 by merely pushing the clips on to that flange. The barbs 11 and 12 of the clips effect frictional engagement with the supporting flange and strongly resist dislodgement of the clips.

The action of the sealing device is indicated in Figure 3. Here the supporting flange 13 is incorporated in a door pillar 15 of a motor vehicle. Under the pressure exerted by the closing of the door 16 against the abutment constituted by the flange 13, the sealing strip 1 changes from its free condition, indicated in dotted outline, to the form shown in full lines. Owing to the hinge-like connection 6 the sealing strip 1 is able to suffer the necessary deformation and displacement to accommodate itself with the available clearance without unduly stressing the connection 6.

The spring clips 9 may be modified as represented at 9A in Figures 4 and 5, so that the offset limb 8A has stamped from it a central tongue 17 which is arranged to extend along the adjoining inner face of the attachment strip 2. The latter is then clasped by the co-operating parts 8A and 17 of the clip 9A.

The sealing device illustrated in Figure 6 comprises an extruded rubber strip 21 which is made of trough-like form for the entry of a supporting flange 22. The base 23 of the trough is pierced longitudinally by two parallel series of slots 24 the transverse spacing of which corresponds to the distance between the limbs of a spring clip 19A. The latter, as can be seen from Figure 7, has oppositely disposed barbs 11 and 12 for the purpose of frictionally embracing the flanges 22 when forced on to the latter. The limbs of the clips 19A are threaded through the corresponding slots 24 to the fullest possible extent, namely until the base of the clip meets the rubber. An outer covering 25 of textile fabric, such as rep, is then applied to the rubber strip 21 by adhesive. In this way the clips 19A are completely concealed and cannot become accidentally detached. The sealing device is now ready for installation, which is effected by merely pushing the clips 19A on to the supporting flange 22, so that zones 23 of the attachment portion 26 of the rubber strip become securely trapped between the base of the clips 19A and the edge of the supporting flange 22. The latter is shrouded on one side by the sealing element 27 proper and on the other side by a flap-like extension 28 of the attachment portion. The actual sealing element 27 may consist of a curved flap of any desired configuration. In the example shown in Figure 6 part of the inner surface of this flap is formed with longitudinal grooves 29 of sawtooth profile in order to provide increased flexibility. In the case of the construction shown in Figure 8 the extruded rubber strip presents a sealing flap 30 of crescent shape in cross-section, and where it merges into the attachment portion 26 a longitudinal V-notch 31 is formed in order to promote an advantageous hinge-like action of the sealing flap, which, under the closing pressure of the door or window, moves into the position indicated in dotted lines. In all other respects, the device of Figure 8 resembles that of Figure 6.

The remaining forms of construction illustrated in Figures 9 to 12 all employ the same design of spring clip 9, which is identical with that shown in Figure 2, and have the sealing element and its integral attachment portion made of extruded rubber strip. In each case there is a substantially U-shaped attachment portion 32 having a flat part 33 which is designed to lie along one face of the supporting flange 22. The flat part 33 is fitted with the spring clips 9 in exactly the same manner as has already been described in connection with the attachment strip 2 of Figure 1.

In Figure 9 the sealing element proper is constituted by a trough-shaped flap 34 which is rooted to the flat part 33 of the attachment portion 32 of the strip. In the example shown in Figure 10 the sealing element is constituted by rubber tubing 35 of cylindrical or oval form which is united by an integrally-formed flexible web 36 to the part 33 of the attachment portion 32 of the strip. This arrangement permits the sealing element to suffer displacement in order to accommodate itself to the closing action of the door or window, without thereby unduly stressing the attachment portion of the strip. This desirable state of affairs is attributable to the hinge-like action afforded by the web 36 of rubber by which the sealing element 35 is united with the attachment portion.

As shown in Figure 11, the sealing element 37 proper may be of substantially D-shaped cross-section. If need be, the flexibility of the closed D-section may be increased by forming the rubber with longitudinal grooves 38 of saw-tooth profile. The outer covering 25 of textile fabric is here applied to the flap-like part of the attachment portion 32 and also to the sealing element 37. In the alternative design illustrated in Figure 12, the D-shaped sealing element 38 is interrupted by a longitudinal gap 39, and the free edge 40 of the resulting flap-like sealing element is directed inwardly.

I claim:

1. Draught-excluding means for attachment to a supporting flange, comprising, in combination, a flap-like sealing strip of approximately V-shaped cross-section and composed of sponge rubber encased by a thin skin of rubber, a substantially U-shaped attachment strip of rubber to one limb of which an edge of said sealing strip is bonded to establish a hinge-like connection therewith, and a series of channel-like spring clips spaced longitudinally within, and transversely transfixing said attachment strip, said clips being designed for frictional engagement with said supporting flange.

2. Draught-excluding means for attachment to a supporting flange, comprising, in combination, a flap-like sealing strip of approximately V-shaped cross-section and composed of sponge rubber encased by a thin skin of rubber, a substantially U-shaped attachment strip of rubber to one limb of which an edge of said sealing strip is bonded to establish a hinge-like connection therewith, said limb of the attachment strip having a succession of transverse slots arranged longitudinally therein, and a plurality of channel-like spring clips designed for frictional engagement with said supporting flange and each having one limb thereof offset, said offset limb being inserted through and transfixing each of said slots from within said attachment strip whereby, when said clips are pushed on to said supporting flange, zones of said attachment strip become securely trapped between said clips and said supporting flange.

3. Draught-excluding means for attachment to a supporting flange, comprising, in combination, a sealing strip of soft rubber, an attachment strip formed integrally with said sealing strip and presenting a flat portion which is arranged to abut said supporting flange, said attachment strip having in its flat portion a succession of transverse slots disposed longitudinally, and a plurality of channel-like spring clips designed for insertion in said slots to transfix them and to effect frictional engagement with said supporting flange whereby, when said clips are pushed on to said supporting flange, zones of said flat portion of the attachment strip become securely trapped between said clips and said supporting flange.

4. Draught-excluding means for attachment to a supporting flange, comprising, in combination, a sealing strip of soft resilient material, an attachment strip united with said sealing strip, said attachment strip presenting a flat portion which is designed to lie against one face of said supporting flange and a flap-like portion which is arranged to shroud the other face of said supporting flange, said flat portion of the attachment strip being transversely perforated by a succession of longitudinally disposed slots, and a plurality of channel-like spring clips designed for frictional engagement with said supporting flange and each having one limb thereof offset, said offset limb being inserted through each of said slots from within said attachment strip to transfix the latter whereby, when said clips are pushed on to said supporting flange, zones of said attachment strip become securely trapped between said clips and said supporting flange.

5. Draught-excluding means for attachment to a supporting flange, comprising, in combination, a sealing strip of soft rubber, an attachment strip of substantially U-shaped cross-section formed integrally with said sealing strip and designed to embrace said supporting flange, said attachment strip having in one limb thereof a series of longitudinally arranged transverse slots, and a plurality of channel-like spring clips designed for insertion in said slots to transfix them and to effect frictional engagement with said supporting flange whereby, when said clips are pushed on to said supporting flange, zones of said slotted limb of the attachment strip become securely trapped between said clips and said supporting flange.

References Cited in the file of this patent

UNITED STATES PATENTS 2,498,852    Doty                Feb. 28, 1950

FOREIGN PATENTS 809,017    Germany             July 23, 1951